United States Patent
Scaringe et al.

[11] Patent Number: 6,132,501
[45] Date of Patent: Oct. 17, 2000

[54] CO-MILLED PIGMENTS IN INK JET INK

[75] Inventors: Raymond P. Scaringe; Steven Evans; Richard C. VanHanehem, all of Rochester, N.Y.

[73] Assignee: Eastman Kodak Company, Rochester, N.Y.

[21] Appl. No.: 09/371,657

[22] Filed: Aug. 10, 1999

[51] Int. Cl.$^7$ ............................................. C09D 11/02
[52] U.S. Cl. ........................ 106/31.75; 106/31.65; 106/31.8; 106/493; 106/494; 106/496
[58] Field of Search ............... 106/31.75, 31.8, 106/31.65, 493, 494, 496

[56] References Cited

U.S. PATENT DOCUMENTS

| | | | |
|---|---|---|---|
| 3,036,059 | 5/1962 | Ehrhardt et al. | 106/31.8 |
| 3,445,453 | 5/1969 | Stocker | 106/496 |
| 3,520,869 | 7/1970 | Stocker | 106/496 |
| 4,251,441 | 2/1981 | Frolich et al. | 106/496 |
| 4,334,932 | 6/1982 | Roueche | 106/496 |
| 4,457,783 | 7/1984 | Hamilton et al. | 106/31.75 |
| 4,523,953 | 6/1985 | Paffoni et al. | 106/496 |
| 4,997,920 | 3/1991 | Hari et al. | 106/31.8 |
| 5,679,138 | 10/1997 | Bishop et al. | 106/31.65 |
| 5,750,323 | 5/1998 | Scaringe et al. | 430/512 |
| 5,985,017 | 11/1999 | Bugner et al. | 106/31.75 |

*Primary Examiner*—Helene Klemanski
*Attorney, Agent, or Firm*—Harold E. Cole

[57] ABSTRACT

An aqueous ink jet ink composition comprising a humectant in an amount of up to about 70% by weight of the composition, and from about 0.5% to about 30% by weight of a co-milled mixture of Pigment Yellow 74 and a pigment having the following structure:

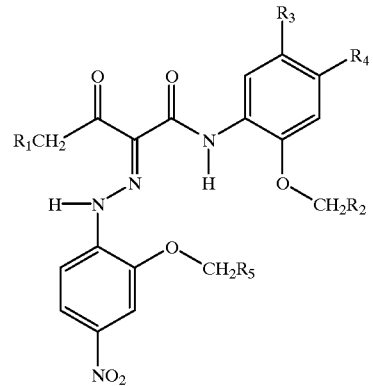

9 Claims, No Drawings

CO-MILLED PIGMENTS IN INK JET INK

FIELD OF THE INVENTION

This invention relates to the use of a co-milled pigment to reduce particle size growth tendency of the parent pigment in ink jet printing inks. The addendum pigment is structurally similar to the parent pigment.

BACKGROUND OF THE INVENTION

Ink jet printing is a non-impact method for producing images by the deposition of ink droplets on a substrate (paper, transparent film, fabric, etc.) in response to digital signals. Ink jet printers have found broad applications across markets ranging from industrial labeling to short run printing to desktop document and pictorial imaging. The inks used in ink jet printers are generally classified as either dye-based or pigment-based.

In pigment-based inks, the colorant exists as discrete particles. These pigment particles are usually treated with dispersants or stabilizers which serve to keep the pigment particles from agglomerating and settling out of the carrier. Water-based pigmented inks are prepared by incorporating the pigment in the continuous water phase by a milling and dispersing process. Because of their nature, pigments are generally considered to be insoluble species. However, some pigments exhibit particle growth by ripening in the ink.

U.S. Pat. No. 5,750,323 relates to a process for making a solid particle dispersion by using a second compound that is structurally similar to a primary compound. The second compound is co-milled with the first and the resulting dispersion is resistant to particle ripening.

U.S. Pat. No. 5,738,716 relates to the use of Pigment Yellow 74 in an ink jet ink which has a desirable hue and color density. This pigment has the following structure:

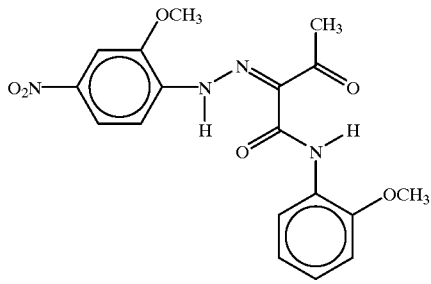

However, there is a problem using this pigment in an ink jet ink in that it ripens readily in typical aqueous based pigmented ink formulations. This limits its utility because as the particle size grows to unacceptable levels, problems arise related to jettability, the ability to eject ink from the print head, color gamut, some hue shift and density loss.

It is an object of this invention to provide an ink jet ink using Pigment Yellow 74 without problems induced by particle ripening in the ink.

SUMMARY OF THE INVENTION

These and other objects are achieved in accordance with this invention which relates to an aqueous ink jet ink composition comprising a humectant in an amount of up to about 70% by weight of the composition, and from about 0.5% to about 30% by weight of a co-milled mixture of Pigment Yellow 74 and a pigment having the following structure:

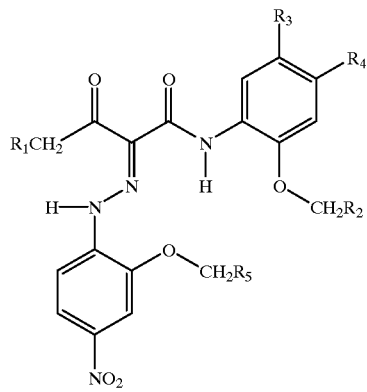

wherein:

$R_1$, $R_2$ and $R_5$ each independently represents H; a substituted or unsubstituted alkyl group of 1 to about 10 carbon atoms; a substituted or unsubstituted aryl group of about 6 to about 10 carbon atoms; or a substituted or unsubstituted hetaryl group of about 5 to about 10 atoms;

$R_3$ and $R_4$ each independently represent the groups listed above for $R_1$, $R_2$ and $R_5$; a substituted or unsubstituted alkoxy group of 1 to about 10 carbon atoms; a substituted or unsubstituted aryloxy group of 6 to about 10 carbon atoms; a substituted or unsubstituted alkoxycarbonyl group; an alkyl-, dialkyl-, aryl-, diaryl-, or arylalkyl-carbamoyl group; an alkyl-, dialkyl-, aryl-, diaryl-, or arylalkyl-sulfamoyl group; an acylamino group; a sulfonylamido group; an alkyl-, dialkyl-, aryl-, diaryl-, or arylalkyl-amino group; or a ureido group;

with the proviso that only one of $R_1$, $R_2$, $R_3$, $R_4$ and $R_5$ is not H.

By use of the invention, the particle growth of PY74 during the milling process has been reduced to essentially zero.

Another embodiment of the invention relates to a process for preparing an aqueous ink jet ink comprising:

a) providing a mixture of Pigment Yellow 74, a pigment having the formula described above and water;

b) mixing the pigment mixture with rigid milling media;

c) introducing the mixture from step b) into a high speed mill;

d) co-milling the mixture from step c) until the desired particle size distribution is obtained;

e) separating the milling media from the co-milled mixture from step d); and f) diluting the mixture from step e) with water and a humectant to obtain the ink jet ink.

DETAILED DESCRIPTION OF THE INVENTION

In the above formula, examples of a substituted or unsubstituted alkyl group include methyl, ethyl, isopropyl, hydroxyethyl, 3-(N,N-dimethylamino)propyl, 2-ethoxyethoxymethyl, and benzyl. Examples of a substituted or unsubstituted aryl group include phenyl, naphthyl and 4-chlorophenyl. Examples of a substituted or unsubstituted hetaryl group include pyridyl, 2-phenylimidazolyl and quinolyl. Examples of an alkoxycarbonyl group include methoxycarbonyl, ethoxycarbonyl and 3-hydroxypropoxycarbonyl. Examples of an aryloxycarbonyl group include phenoxycarbonyl and 4-chlorophenoxycarbonyl. Examples of an alkyl-aralkyl-, aryl-, diaryl-or dialkyl carbamoyl group include N-methylcarbamoyl, N-methyl-N-phenyl-carbamoyl, N-p-(trimethylammonium)phenylcarbamoyl and N,N-bis (4-dimethylaminophenyl)carbamoyl. Examples of an alkyl-aralkyl-, aryl-, diaryl-or dialkyl sulfamoyl group include N-methylsulfamoyl, N-methyl-N-phenylsulfamoyl, N-p-(trimethylammonium)phenylsulfamoyl and N,N-bis (4-dimethylaminophenyl)sulfamoyl. Examples of an acylamino group include acetamido, methoxyethylacetamido and benzamido. Examples of a ureido group include N-methylureido, ureido and N,N'-dimethylureido. Examples of a sulfonylamido group include methanesulfonamido, p-toluenesulfonamido and 2-(trimethlyammonium) ethanesulfonamido. Examples of an alkyl-aralkyl-, aryldiaryl- or dialkylamino group include methylamino, N,N-dimethylamino, methoxyethylamino and anilino.

Co-milled pigments useful in the invention include the following:

weight of a co-milled mixture of pigments. In a preferred embodiment of the invention, the ink composition comprises from about 1% to about 5% by weight of the pigment mixture.

The carrier employed in the ink composition can be water or a mixture of water and at least one water-soluble co-solvent. Selection of a suitable mixture depends on requirements of the specific application, such as desired surface tension and viscosity, the selected pigments, drying time of the pigmented ink jet ink, and the type of paper onto which the ink will be printed. Representative examples of water-soluble co-solvents that may be selected include (1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; (2) ketones or ketoalcohols such as acetone, methyl and ethyl ketone and diacetone alcohol; (3) ethers, such as tetrahydrofuran and dioxane; (4) esters, such as ethyl acetate, ethyl lactate, ethylene carbonate and propylene carbonate; (5) polyhydric alcohols, such as

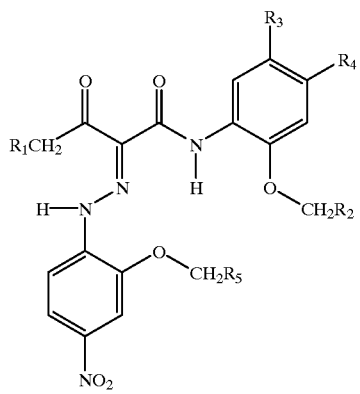

| Pigment | $R_1$ | $R_2$ | $R_3$ | $R_4$ | $R_5$ |
|---|---|---|---|---|---|
| 1 | H | H | H | H | $C_6H_5$ |
| 2 | H | H | H | H | $CH_2C_6H_5$ |
| 3 | H | H | H | H | $C_6H_{13}$ |
| 4 | H | H | H | H | $(C_2H_4O)_3C_2H_4OH$ |
| 5 | $C_6H_5$ | H | H | H | H |
| 6 | H | $C_6H_5$ | H | H | H |
| 7 | H | H | $C_2H_4SO_3^-Na^+$ | H | H |
| 8 | H | H | H | $SO_2NHC_6H_{13}$ | H |
| 9 | $C_6H_{13}$ | H | H | H | H |
| 10 | H | $CO_2C_2H_5$ | H | H | H |

In a preferred embodiment of the invention, $R_1$ is $C_6H_5$ or $C_6H_{13}$ and $R_2$, $R_3$, $R_4$, and $R_5$ are H. In another preferred embodiment of the invention, $R_2$ is $C_6H_5$ or $CO_2C_2H_5$ and $R_1$, $R_3$, $R_4$, and $R_5$ are H. In still another preferred embodiment of the invention, $R_3$ is $C_2H_4SO_3^-Na^+$ and $R_1$, $R_2$, $R_4$, and $R_5$ are H. In yet another embodiment of the invention, $R_4$ is $SO_2NHC_6H_{13}$ and $R_1$, $R_2$, $R_3$, and $R_5$ are H. In another embodiment of the invention, $R_5$ is phenyl, benzyl or hexyl and $R_1$, $R_2$, $R_3$, and $R_4$ are H. In another preferred embodiment of the invention, $R_5$ is $(C_2H_4O)_3C_2H_4OH$ and $R_1$, $R_2$, $R_3$, and $R_4$ are H.

In a preferred embodiment of the invention, the pigments employed have a particle size of from about 10 nanometers to about 1000 nanometers.

As noted above, the ink jet ink composition of the invention comprises from about 0.5% to about 30% by ethylene glycol, diethylene glycol, triethylene glycol, propylene glycol, tetraethylene glycol, polyethylene glycol, glycerol, 2-methyl-2,4-pentanediol 1,2,6-hexanetriol and thioglycol; (6) lower alkyl mono- or di-ethers derived from alkylene glycols, such as ethylene glycol mono-methyl (or -ethyl) ether, diethylene glycol mono-methyl (or -ethyl) ether, propylene glycol mono-methyl (or -ethyl) ether, triethylene glycol mono-methyl (or -ethyl) ether and diethylene glycol di-methyl (or -ethyl) ether; (7) nitrogen-containing cyclic compounds, such as pyrrolidone, N-methyl-2-pyrrolidone, and 1,3-dimethyl-2-imidazolidinone; and (8) sulfur-containing compounds such as dimethyl sulfoxide and tetramethylene sulfone.

A humectant is also employed in the ink jet composition of the invention to help prevent the ink from drying out or crusting in the orifices of the printhead. Examples of humectants which can be used include polyhydric alcohols, such as ethylene glycol, diethylene glycol, triethylene glycol, propylene glycol, tetraethylene glycol, polyethylene glycol, glycerol, 2-methyl-2,4-pentanediol 1,2,6-hexanetriol and thioglycol; lower alkyl mono- or di-ethers derived from alkylene glycols, such as ethylene glycol mono-methyl or mono-ethyl ether, diethylene glycol mono-methyl or mono-ethyl ether, propylene glycol mono-methyl or mono-ethyl ether, triethylene glycol mono-methyl or mono-ethyl ether, diethylene glycol di-methyl or di-ethyl ether, and diethylene glycol monobutylether; nitrogen-containing cyclic compounds, such as pyrrolidone, N-methyl-2-pyrrolidone, and 1,3-dimethyl-2-imidazolidinone; and sulfur-containing compounds such as dimethyl sulfoxide and tetramethylene sulfone. A preferred humectant for the composition of the invention is diethylene glycol, glycerol, or diethylene glycol monobutylether. The humectant may be present in any amount effective for the intended purpose. In general, good results have been obtained when the humectant is present in an amount of up to about 70% by weight of the ink jet ink composition, preferably from about 5 to about 50%.

Ink Preparation

A preferred method for making the inks of the invention is disclosed in U.S. Pat. No. 5,679,138, the disclosure of which is hereby incorporated by reference. In general it is desirable to make the pigmented ink jet ink in the form of a concentrated mill grind, which is subsequently diluted to the appropriate concentration for use in the ink jet printing system. This technique permits preparation of a greater quantity of pigmented ink from the equipment.

The amount of water carrier employed in the ink of the invention may range from approximately 70 to 99.8 weight %, preferably approximately 90 to 99.8 weight %, based on the total weight of the ink. A mixture of water and a polyhydric alcohol, such as diethylene glycol, is preferred as the aqueous carrier medium. In the case of a mixture of water and diethylene glycol, the aqueous carrier medium usually contains from about 30% water/70% diethylene glycol to about 95% water/5% diethylene glycol. The preferred ratios are approximately 60% water/40% diethylene glycol to about 95% water/5% diethylene glycol. Percentages are based on the total weight of the aqueous carrier medium.

Jet velocity, separation length of the droplets, drop size and stream stability are greatly affected by the surface tension and the viscosity of the ink. Pigmented ink jet inks suitable for use with ink jet printing systems should have a pH in the range of 5 to 9. Anionic and cationic surfactants may be used in the invention as disclosed in U.S. Pat. Nos. 5,324,349; 4,156,616 and 5,279,654 as well as many other surfactants known in the ink jet ink art. Commercial surfactants include the Surfynols® from Air Products; the Zonyls® from DuPont Corp. and the Fluorads® from the 3M Co.

Acceptable viscosity's are usually no greater than 20 centipoise, and preferably in the range of about 1.0 to about 10.0, most preferably 1.0 to 5.0 centipoise at room temperature.

The ink has physical properties compatible with a wide range of ejecting conditions, i.e., driving voltages and pulse widths for thermal ink jet printing devices, driving frequencies of the piezo element for either a drop-on-demand device or a continuous device, and the shape and size of the nozzle.

Other ingredients are also commonly added to ink jet inks. A penetrant (0–10 wt. %) may be added to help the ink penetrate the receiving substrate, especially when the substrate is a highly sized paper. A preferred penetrant for the inks of the present invention is n-propanol at a final concentration of 1–6 wt. %. A biocide (0.01–1.0 wt. %) may be added to prevent unwanted microbial growth which may occur in the ink over time. A preferred biocide for the inks of the present invention is Proxel® GXL (Zeneca Colours Co.) at a final concentration of 0.05–0.5 wt. %. Additional additives which may optionally be present in ink jet inks include thickeners, conductivity enhancing agents, antikogation agents, drying agents, and defoamers.

The ink jet inks provided by this invention are employed in ink jet printing wherein liquid ink drops are applied in a controlled fashion to an ink receptive layer substrate, by ejecting ink droplets from the plurality of nozzles, or orifices, in a print head of ink jet printers Ink-receptive substrates useful in ink jet printing are well known to those skilled in the art. Representative examples of such substrates are disclosed in U.S. Pat. Nos. 5,605,750; 5,723,211; and 5,789,070 and EP 813 978 A1, the disclosures of which are hereby incorporated by reference.

Commercially available ink jet printers use several different methods to control the deposition of the ink droplets. Such methods are generally of two types: continuos stream and drop-on-demand.

In drop-on-demand systems, a droplet of ink is ejected from an orifice directly to a position on the ink receptive layer by pressure created by, for example, a piezoelectric device, an acoustic device, or a thermal process controlled in accordance digital data signals. An ink droplet is not generated and ejected through the orifices of the print head unless it is needed. Inkjet printing methods, and related printers, are commercially available and need not be described in detail.

The following examples illustrate the utility of the present invention.

EXAMPLES

Following are control pigments that are used in the examples which have a structure similar to the pigments of the invention:

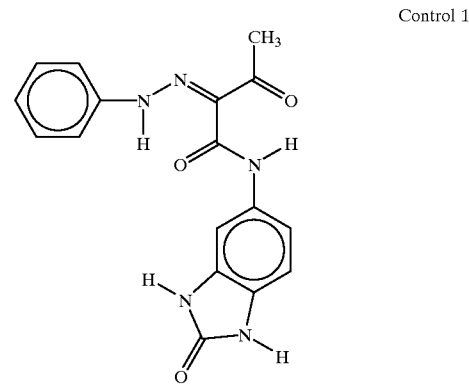

Control 1

Control 2

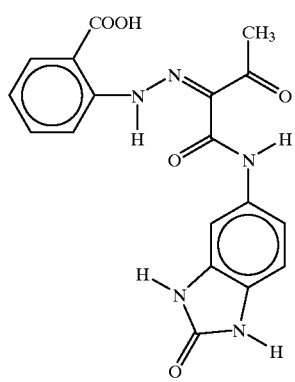

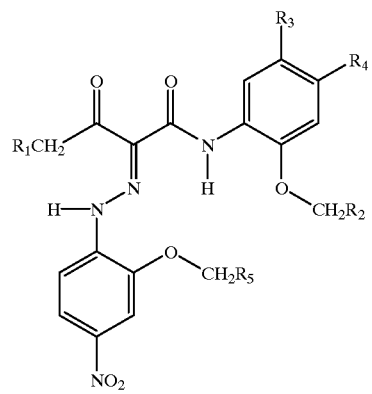

Control 1, Control 2 and Pigment 1 (illustrated above) were individually co-milled with PY74 at 90:10 wt.:wt. ratio with dispersant sodium oleomethyltaurine (NaOMT) (12.5 wt % of total pigment weight, except for Pigment 1 which used 25 wt % of total pigment) in water using a micro-media mill to prepare mill grinds. Milling time is typically four hours. It is known that the higher the level of NaOMT, the worse the ripening rate becomes, so using a higher level for Pigment 1 mill grind does not compromise the results.

These mill grinds are formulated into ink of the following composition: Sufficient mill grind to give a total pigment concentration in the ink of 2.5 wt. %, diethylene glycol (16 wt. %), Strodex PK90® (0.6 wt. %), triethanolamine (0.25 wt %), and sufficient water to make 100 wt. %. The particle size of these inks is measured when freshly prepared and after incubation at 50° C. for the times shown below in Table 1 by UPA (Ultra Particle Analyzer, Honeywell) measurement. The data shown below are the tenth, fiftieth, and ninetieth percentile of particle size

TABLE 1

| Pigment co-milled with Pigment PY74 | Particle Size Initial and (After Incubation for 2 weeks) | | |
|---|---|---|---|
| | 10th Percentile | 50th Percentile | 90th Percentile |
| None | 12.4 (39.4) | 16.7 (79.1) | 63.5 (237) |
| PY 151 (control 1) | 13.7 (44.8) | 22.4 (92.5) | 107 (246) |
| PY 175 (control 2) | 14.1 (36.9) | 23.8 (76.3) | 89.9 (219) |
| 1 | 8.3 (8.5) | 10.3 (10.5) | 16.3 (19.5) |

The above data show that the dispersion containing Pigment 1 inhibits PY74 particle ripening as compared to the control dispersion without any added pigment, or two control dispersions with other similar pigments added.

The invention has been described in detail with particular reference to certain preferred embodiments thereof, but it will be understood that variations and modifications can be effected within the spirit and scope of the invention.

What is claimed is:

1. An aqueous ink jet ink composition comprising a humectant in an amount of up to about 70% by weight of said composition, and from about 0.5% to about 30% by weight of a co-milled mixture of Pigment Yellow 74 and a pigment having the following structure:

wherein:

$R_1$, $R_2$ and $R_5$ each independently represents H; a substituted or unsubstituted alkyl group of 1 to about 10 carbon atoms; a substituted or unsubstituted aryl group of about 6 to about 10 carbon atoms; or a substituted or unsubstituted hetaryl group of about 5 to about 10 atoms;

$R_3$ and $R_4$ each independently represent the groups listed above for $R_1$, $R_2$, and $R_5$; a substituted or unsubstituted alkoxy group of 1 to about 10 carbon atoms; a substituted or unsubstituted aryloxy group of 6 to about 10 carbon atoms; a substituted or unsubstituted alkoxycarbonyl group; an alkyl-, dialkyl-, aryl-, diaryl-, or arylalkyl-carbamoyl group; an alkyl-, dialkyl-, aryl-, diaryl-, or arylalkyl-sulfamoyl group; an acylamino group; a sulfonylamido group; an alkyl-, dialkyl-, aryl-, diaryl-, or arylalkyl-amino group; or a ureido group;

with the proviso that only one of $R_1$, $R_2$, $R_3$, $R_4$ and $R_5$ is not H.

2. The composition of claim 1 wherein $R_1$ is $C_6H_5$ or $C_6H_{13}$ and $R_2$, $R_3$, $R_4$, and $R_5$ are H.

3. The composition of claim 1 wherein $R_2$ is $C_6H_5$ or $CO_2C_2H_5$ and $R_1$, $R_3$, $R_4$, and $R_5$ are H.

4. The composition of claim 1 wherein $R_3$ is $C_2H_4SO_3^-$ $Na_+$ and $R_1$, $R_2$, $R_4$, and $R_5$ are H.

5. The composition of claim 1 wherein $R_4$ is $SO_2NHC_6H_{13}$ and $R_1$, $R_2$, $R_3$, and $R_5$ are H.

6. The composition of claim 1 wherein $R_5$ is phenyl, benzyl or hexyl and $R_1$, $R_2$, $R_3$, and $R_4$ are H.

7. The composition of claim 1 wherein $R_5$ is $(C_2H_4O)_3C_2H_4OH$ and $R_1$, $R_2$, $R_3$, and $R_4$ are H.

8. The composition of claim 1 comprising from about 1% to about 5% by weight of said pigment mixture.

9. A process for preparing an aqueous ink jet ink comprising:

a) providing a mixture of Pigment Yellow 74, a pigment having the formula described in claim 1 and water;

b) mixing said pigment mixture with rigid milling media;

c) introducing the mixture from step b) into a high speed mill;

d) co-milling the mixture from step c) until the desired particle size distribution is obtained;

e) separating said milling media from said co-milled mixture from step d); and f) diluting said mixture from step e) with water and a humectant to obtain said ink jet ink.

* * * * *